United States Patent
Salber et al.

[11] Patent Number: 5,647,312
[45] Date of Patent: Jul. 15, 1997

[54] FOUR-STROKE OTTO ENGINE HAVING HYBRID CONTROL

[75] Inventors: Wolfgang Salber; Thomas Esch; Michael Schebitz, all of Aachen, Germany

[73] Assignee: FEV Motorentechnik GmbH & Co. Kommanditgesellschaft, Aachen, Germany

[21] Appl. No.: 411,732

[22] PCT Filed: Jul. 30, 1994

[86] PCT No.: PCT/EP94/02542

§ 371 Date: May 8, 1995

§ 102(e) Date: May 8, 1995

[87] PCT Pub. No.: WO95/04210

PCT Pub. Date: Feb. 9, 1995

[30] Foreign Application Priority Data

Aug. 3, 1993 [DE] Germany .............. 43 25 994.4
Dec. 9, 1993 [DE] Germany .............. 43 41 945.3

[51] Int. Cl.⁶ ................................................ F01L 1/34
[52] U.S. Cl. ................................. 123/90.16; 123/90.32
[58] Field of Search .................... 123/90.11, 90.15, 123/90.16, 90.32

[56] References Cited

U.S. PATENT DOCUMENTS

| | | | |
|---|---|---|---|
| 4,249,488 | 2/1981 | Siegla | 123/90.32 |
| 4,380,219 | 4/1983 | Walsh | 123/90.32 |
| 5,117,790 | 6/1992 | Clarke et al. | 123/90.11 |
| 5,183,011 | 2/1993 | Fuji et al. | 123/1 A |
| 5,201,296 | 4/1993 | Wunning et al. | 123/90.11 |
| 5,269,270 | 12/1993 | Suzuki et al. | 123/90.16 |
| 5,273,006 | 12/1993 | Schäpertöns et al. | 123/90.16 |
| 5,301,636 | 4/1994 | Nakamura | 123/90.16 |

FOREIGN PATENT DOCUMENTS

| | | |
|---|---|---|
| 0376714 | 7/1990 | European Pat. Off. . |
| 3024109 | 1/1982 | Germany . |
| 57-206723 | 12/1982 | Japan . |
| 59-90718 | 5/1984 | Japan . |
| 2197686 | 5/1988 | United Kingdom . |

*Primary Examiner*—Erick R. Solis
*Attorney, Agent, or Firm*—Spencer & Frank

[57] ABSTRACT

A four-stroke Otto engine. At least two intake valves of the engine have an open position and a closed position, and include a main intake valve and an additional intake valve. A camshaft moves the main intake valve into its open position and into its closed position, and a transmission element transmits a motion of the camshaft to the main intake valve. The transmission element includes a cutoff apparatus actuatable independently of the camshaft for cutting off a transmission of the actuation of the camshaft to the main intake valve for keeping the main intake valve in its closed position in a lower partial load and rpm range of the engine. An operating apparatus connected to the additional intake valve actuates the additional intake valve independently of the actuation of the main intake valve for moving the additional intake valve into its open position in a lower partial load and rpm range of the engine and into its closed position in an upper partial load and rpm range of the engine. The operating apparatus further adjusts at least one of a valve stroke of the additional intake valve, a valve opening time of the additional intake valve and a valve closing time of the additional intake valve as a function of engine load. An intake control device controls the cutoff apparatus and the operating apparatus.

8 Claims, 4 Drawing Sheets

FOUR-STROKE OTTO ENGINE HAVING HYBRID CONTROL

BACKGROUND OF THE INVENTION

1. Field of the Invention

The invention relates to a four-stroke Otto engine having at least one cylinder and, for each cylinder, at least one intake valve with positive control and at least one outlet valve with positive control, with at least one intake conduit for the supply of air or an air-fuel mixture to the intake valve.

2. Description of the Prior Art

Because of operating conditions and the broad range of areas of application, contemporary four-stroke Otto engines are designed for a large rpm/load range. To realize high torque and output data, and an acceptable efficiency and exhaust-gas emission ratio in partial-load operation and/or in the lower rpm range, compromises in design must be made with regard to the design of the valve-control time, the valve stroke, the valve seat geometry, the structure of the intake conduit and intake system, and the mixture formation. The primary operating range of the engines lies within the lower rpm/load range, i.e., at an effective medium pressure of 0 to approximately 5 bar and at an rpm between the idling rpm and approximately 3500 1 /min. This operating range covers the dwell period in the test cycles prescribed for type and series/model standard for determining exhaust gas emissions and fuel consumption up to above 90 percent.

In four-stroke Otto engines, quantity-controlled output control is regulated by the mass of working fluid used. In a camshaft-controlled load change, a throttling of the fresh intake mass is necessary in order to be able to operate the engine in all operating ranges, that is, from idling operation with a low fresh intake mass to full-load operation with a fully open throttle element. In these throttle-controlled engines, an adaptation of the charge composition (residual gas, fresh intake mass) and an rpm-dependent adaptation of the valve control times to full-load operation is typically effected solely by a phase shift of the valve control times.

Throttle-free control of the fresh intake mass used is not possible in the entire operating range with this phase shift. For operation at higher rpms and loads, the intake valve cross-section must be enlarged for the charge change. This is realized in a practical manner by the connection of one or a plurality of valves. These connectable valves can be operated by means of a camshaft, in which case the charge quantity is throttle-controlled. Stepless regulation and control of the charge quantity and the charge composition can be accomplished with fully-variable intake valve control times. The charge change losses occurring in internal combustion engines, depending on their operating principles, can thus be eliminated. Furthermore, an adaptation of the charge composition is possible in all operating ranges.

The disadvantages of throttle-controlled combustion engines occur predominantly in the lower rpm/load range. If this operating range is used with systems for realizing fully-variable control times, the fuel consumption behavior and exhaust gas emissions are improved through saving throttle losses and the adaptation of the charge composition. Systems for realizing completely-variable control times, especially when actuation is effected by electromechanical setting units, can be designed especially for this lower operating range in the characteristic field with respect to optimum efficiency.

SUMMARY OF THE INVENTION

The object of the invention is to configure a four-stroke Otto engine of the type characterized at the outset such that the combustion process, and thus the exhaust gas emissions and fuel consumption, are improved, so that optimum fuel consumption and optimum exhaust gas values result both for operation in the partial-load range and the full-load range.

According to the invention, this object is accomplished in that at least two intake valves are provided, with at least one intake valve serving as the main valve and at least one intake valve serving as an additional valve; that the main valve is connected to a camshaft via a transmission element; that the transmission element has an actuatable cutoff apparatus, and that the additional valve is connected to an operating apparatus that can be actuated and with which the valve stroke and/or the time for the valve opening and/or the time for the valve closure can be adjusted. With a four-stroke Otto engine configured in this manner, it is possible to perform the charge change in large characteristic field ranges, both throttle-free with fully-variable intake valve control times and with throttling with intake valve control times that are fixed or can be phase-shifted. In an embodiment according to the invention, the actuatable operating apparatus is designed for stepless or stepwise adjustment of the valve stroke and/or of the time of the valve opening and/or of the time of the valve closure.

Optimum adaptation to the operating requirements in both the lower partial-load range and the upper partial-load range, up to full load, is possible with the aid of a four-stroke Otto engine configured in this way, so that optimum operating conditions can be created for the entire characteristic field of the engine. It is possible to perform an optimum adaptation to the conditions in the lower partial-load range with the arrangement of the additional valve, by means of whose actuatable operating apparatus the valve stroke and/or the time for the valve opening and/or the time for the valve closure can be adjusted, such that the main valve is held in the closed position with the aid of the actuatable cutoff apparatus. The inflow conditions, the charge composition and the charge quantity can be adapted precisely to the operating conditions in the partial-load range, both for a cold start and hot running. This also permits control of the charge quantity via the actuation of the operating apparatus, so that throttling of the mass flow of the air-fuel mixture can be omitted. The consequence of minimizing throttle losses caused by this is a distinct improvement in fuel consumption. The improvement in inflow conditions is accomplished by an adaptation of the valve stroke of the valve controlled by the operating apparatus to the mass flow of the air-fuel mixture required in the partial-load range. The charge composition and the charge quantity are influenced by changes in the control times, i.e., the time for the valve opening and/or the valve closure. An electromechanically-operating device, as known from, for example, DE 30 24 109 C2, is advantageously suited as an operating apparatus. This device has compression springs and two electrically-operating switching magnets, via which the additional valve can be moved into two discrete switching positions located opposite one another, and held in this switching position by the respectively associated switching magnet. The state of equilibrium of the compression springs acting on the additional valve lies between these two switching positions; the state of equilibrium of the compression springs can be relocated to the region of one of the two switching positions via a clamping device, preferably electromechanical. This clamping device, like the two switching magnets, can be operated electromechanically, so that a purposeful change in the valve stroke and/or the opening or closing time of the additional valve is possible as a function of the operating conditions in the partial-load range by means of a corresponding control of the respective exciting current for the coils of the switching magnets, on the one hand, and the magnets for the clamping device on the other. Because of the favorable actuation possibility, this type of electromechanical operating apparatus is to be actuated via the exciting currents in order to influence the individual functions.

If the engine is to be operated in the upper partial-load range up to full load, when a predetermined load and rpm limit is exceeded, the operating apparatus for the additional valve is held in the closed position, and the cutoff of the main valve is released, so that the predetermined, optimum operation takes place by means of the main valve, which preferably has positive control via a camshaft.

While it is essentially possible to charge the main valve and additional valve by way of a common intake conduit, in an advantageous embodiment it is provided that a separate intake conduit is provided for the main valve, on the one hand, and for the additional valve on the other. This permits the intake conduit configuration for the lower partial-load range, i.e., the operating range in which the main valve is held in the closed position and the supply of air or the air-fuel mixture into the cylinder only takes place via the additional valve, to be adapted precisely to the inflow conditions that apply for the operating range.

BRIEF DESCRIPTION OF THE DRAWINGS

The invention is explained in detail in conjunction with schematic drawings of an embodiment. Shown are in.

DETAILED DESCRIPTION OF THE INVENTION

Figure 1:
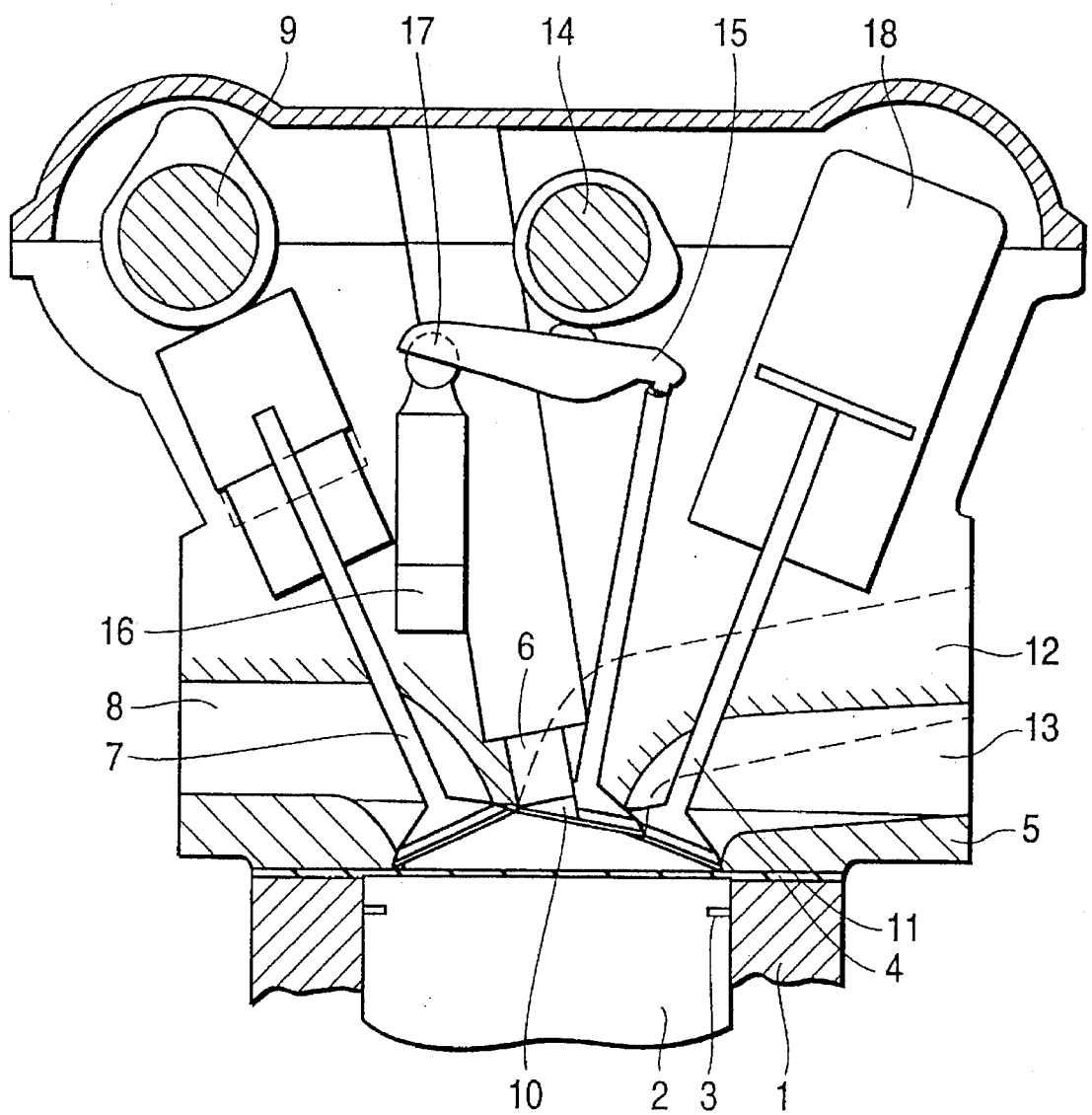
FIG. 1 a vertical section through a cylinder of a four-stoke Otto engine.

FIG. 1 shows a schematic vertical section through the upper part of a four-stroke Otto engine in which a piston 2 is represented in its position in upper dead center. The cylinder 1, with piston rings 3, is covered by a cylinder-head seal 4 with a cylinder head 5, which is provided with a bore 6 for receiving a spark plug.

At least one outlet valve 7 per cylinder that blocks an associated exhaust gas conduit 8 against the cylinder interior is disposed in the cylinder head 5. The outlet valve is actuated in a typical manner, via a camshaft 9, according to the charge cadence.

On the intake side, at least two intake valves 10 and 11 are provided; in the illustrated embodiment, these valves are allocated separate intake conduits 12 and 13, so that the intake valve 10 is associated with the intake conduit 12 and the intake valve 11 is associated with the intake conduit 13. For better understanding of the representation in FIG. 1, it is pointed out that the sectional representation does not extend in one plane, but, as can be seen from the representation of the intake valve 10, the valves are disposed adjacently and spatially staggered with respect to the plane of projection. The allocation will be explained in detail below.

The intake valve 10 is operated by a transmission element driven by a camshaft 14. The transmission element can, for example, a drag lever 15. The drag lever 15 is connected to a cutoff apparatus 16, which can be operated purely mechanically, electromechanically or mechanically-hydraulically in such a way that, by means of the lowering of the fulcrum 17 for the drag lever 15, the drag lever 15 no longer opens the intake valve 10, and the valve remains in the closed position. The intake valve 10 serves as the main valve and, as will be explained in detail below in connection with FIG. 3, functions during engine operation in the upper partial-load and rpm range. The intake valve 11 is connected to an actuatable operating device 18, which is constructed, for example, electromechanically, and which opens or closes the valve 11 in the charge cadence in the operating cycle. The operating apparatus 18 is designed such that it can be used for stepless or stepwise adjustment of the valve stroke and/or of the time for the valve opening and/or of the time for the valve closure. The intake valve 11 serves as the additional valve, and functions during engine operation only in the lower partial-load and rpm range.

Figure 2:
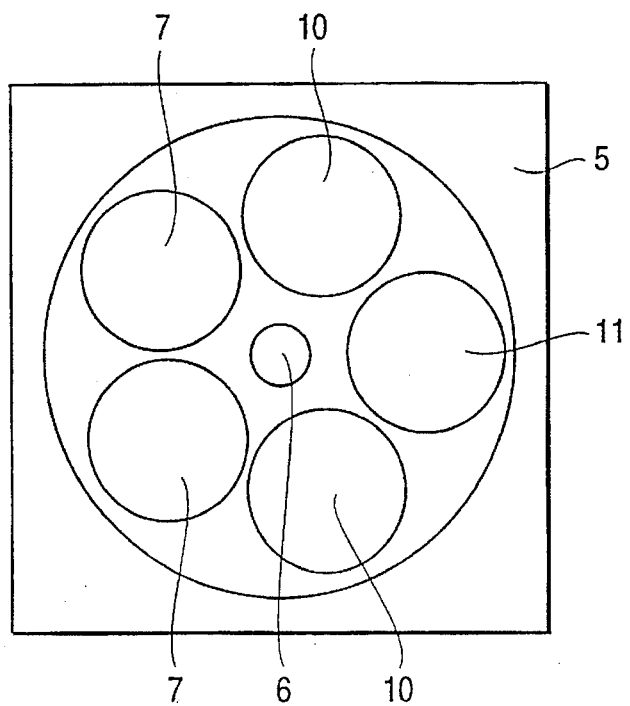
FIG. 2 a view of the underside of the cylinder head.

Depending on the engine type, the arrangement can include the provision of an outlet valve 7, a camshaft-controlled intake valve 10 and an intake valve 11 controlled by means of an electromechanical operating apparatus. The number of cam-controlled valves, however, can be varied depending on the engine type. Hence, FIG. 2 shows a view from below the cylinder head of an arrangement in which two outlet valves 7 operated in parallel and two intake valves 10 controlled in parallel via the camshaft 14 are provided, as is an intake valve 11 that can be actuated by means of an operating apparatus 18.

The cutoff apparatus, which actuates the fulcrum 17 of the drag lever 15 of the intake valve 10 and, simultaneously, the operating apparatus 18 of the intake valve 11, can now be actuated with an actuation to be described in detail below, and vice versa. With this arrangement, it is possible, as shown schematically in FIG. 3, to operate the engine in the upper partial-load range, up to the full-load line, and at high rpms of the air-fuel mixture via the intake conduit 12 and the intake valve 10.

Figure 3:
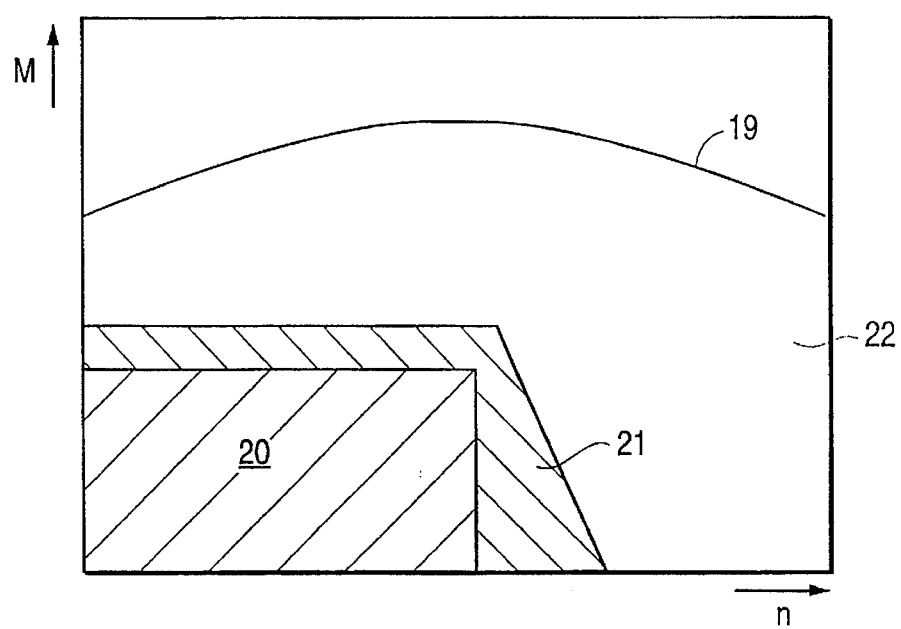
FIG. 3 a torque-rpm characteristic field.

A schematic characteristic field of a four-stroke Otto engine is shown in FIG. 3. The characteristic field, i.e., the dependency of the torque on the rpm, is defined by the full-load line 19. Depending on the valve geometry of the intake valve 11, a lower partial-load range and an rpm limit 20 are defined; these define an upper partial-load range 22 above a likewise predeterminable switching region 21. The control device is configured such that, in the lower partial-load range 20, the main valve 10 is held in the closed position by means of the cutoff apparatus 16, so that operation is effected solely by the controllable operating apparatus 18 of the additional valve 11. The desired output optimization in the lower partial-load range is effected by the actuation of the operating apparatus 18. As soon as the partial-load range 20 is exited due to the rpms and/or the decreased torque, the operating apparatus can be deactivated in the predetermined switching range 21 by means of the control system, so that the additional valve 11 remains in the closed position and the cutoff of the main valve 10 is released, so that operation is now effected in the upper partial-load range in a typical way, via the camshaft-controlled main valve 10, in which case the supply of air or the air-fuel mixture takes place in a conventional way, via a load- and rpm-dependent, throttle-controlled charge regulation. The switch from operation with the additional valve to operation with the main valve and vice versa must take place as a function of the work cycle for each cylinder, for example in the exhaust phase or the compression phase.

Figure 4:
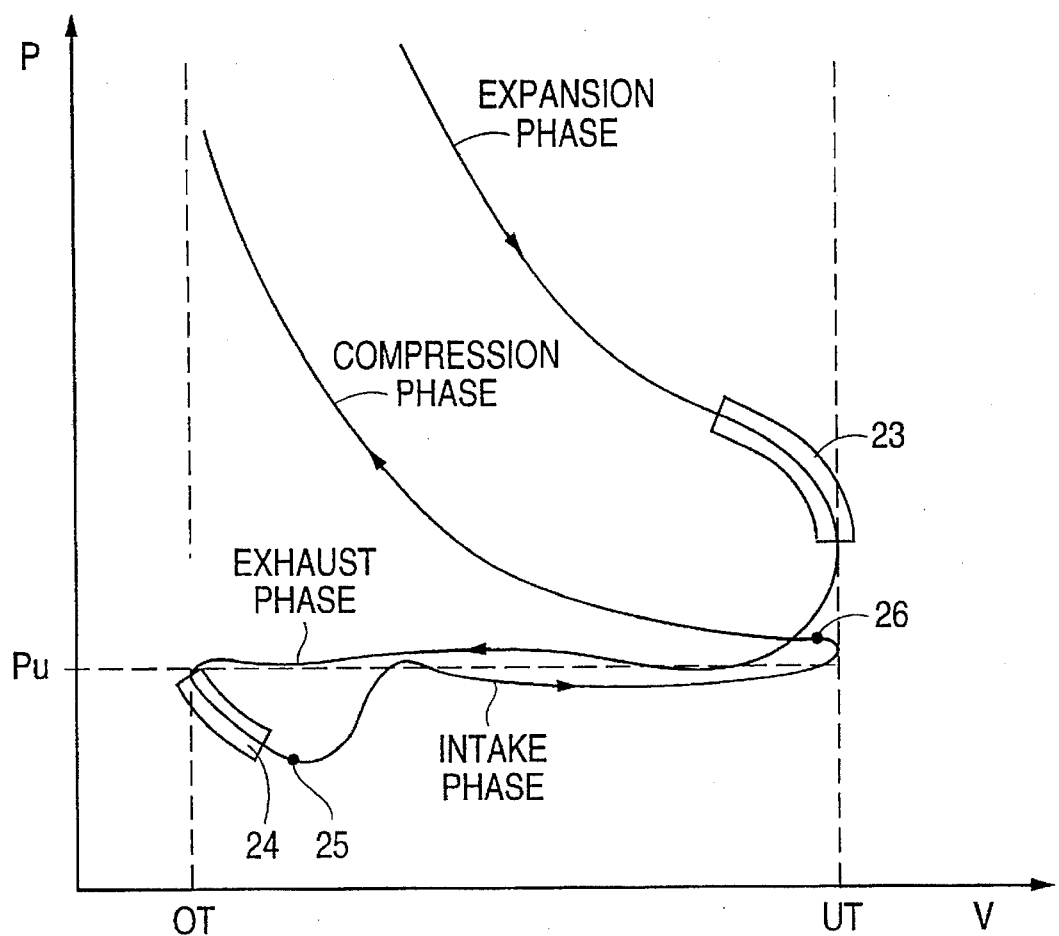
FIG. 4 a charge change diagram.

In FIG. 4, an operating cycle for a four-stroke Otto engine is illustrated in a cylinder pressure diagram for operation in the lower partial-load range. In the expansion phase, the pressure drops until, shortly before lower dead center UT is reached, it reaches a range 23, in which the outlet valve opens. The indicated region 23 shows the option of relocating the opening time, via a corresponding camshaft adjustment, to a range prior to reaching lower dead center UT by the piston. The exhaust phase then follows until the piston has again reached upper dead center OT. In camshaft-controlled outlet valves, the option exists of changing the closure time of the outlet valve 7 in the range characterized by the field 24, corresponding to the desired operating conditions, for example in order to influence the test gas component in the camshaft-controlled operating range.

Because the additional valve 11 is operated by means of the operating apparatus 18, independently of the camshaft control, in this operating state, the opening time 25 can now be relocated in an arbitrary and stepless manner with respect to the position of the piston at upper dead center OT in order to optimize the inflow conditions. For example, to improve the cold start and hot running behavior, it is possible to relocate the opening time 25 to a later time after upper dead center OT, so that, when the additional valve 11 is closed and the outlet valve is closed during the downward movement of the piston, a lower pressure is established in the cylinder, which effects a higher-speed inflow when the additional valve 11 is opened later. The increased inflow speeds cause the turbulence of the cylinder charge necessary for a thermodynamically favorable, rapid combustion. By means of an appropriate actuation of the operating apparatus 18, the time 25, i.e., the "intake opens" time, can be relocated in a stepless manner to a range up to behind lower dead center UT before the compression phase. The associated control time 26, "intake closes," is adapted depending on the load.

The above description of the function of a four-stroke Otto engine according to the invention in partial-load operation with an additional valve 11 shows the substantial adaptation options to the respectively prevailing operating conditions in this range. As stipulated by the system, in electromechanically-controlled valves a free passage that corresponds to the valve stroke must be assured.

Because the additional valve is only required for operation in the partial-load range, that is, a correspondingly reduced intake cross-section is necessary for this operating range, the possibility arises of reducing the maximum required valve stroke, and thus the free passage for the valve that is assured by valve recesses cut into the piston. This leads, in addition to the operation-stipulated improvements, to a more compact configuration of the combustion chamber and consequently to improved combustion with fewer unburnt hydrocarbon components. Moreover, as a consequence of the smaller free valve passage, the piston thickness and thus the piston weight can be significantly reduced, which leads to a reduction in the oscillating masses and a considerable reduction in friction losses of the engine.

In the upper load range 22 (see FIG. 3), the additional valve 11 is held in the closed position by the operating apparatus 18, so that the additional valve 11 remains closed and operation takes place exclusively by means of the camshaft-controlled main valve 10. The valve seat geometry, the intake conduit, the intake system and the mixture former can be designed for the charge throughput needed for this range, with larger quantities of air-fuel mixture; in particular, the option exists of designing the intake conduit 12 for the main valve and the intake conduit 13 for the additional valve to correspond to the different quantity flows.

The position, type and number of mixture formers can be adapted to the number of intake conduits and the size of the intake conduits. Therefore, it is possible to provide a central mixture former, both for each individual cylinder and for all cylinders. Furthermore, it is possible to provide a central mixture former for operation in the lower partial-load range, and individual injection for operation in the camshaft-controlled, upper partial-load range. However, because of the good adaptation possibilities to requirements in the lower partial-load range, it is also possible to provide an individual injection for this range, and to provide a central mixture former for operation in the upper partial-load and full-load range. The individual injection can take place into the intake pipe or directly into the combustion chamber.

Figure 5:
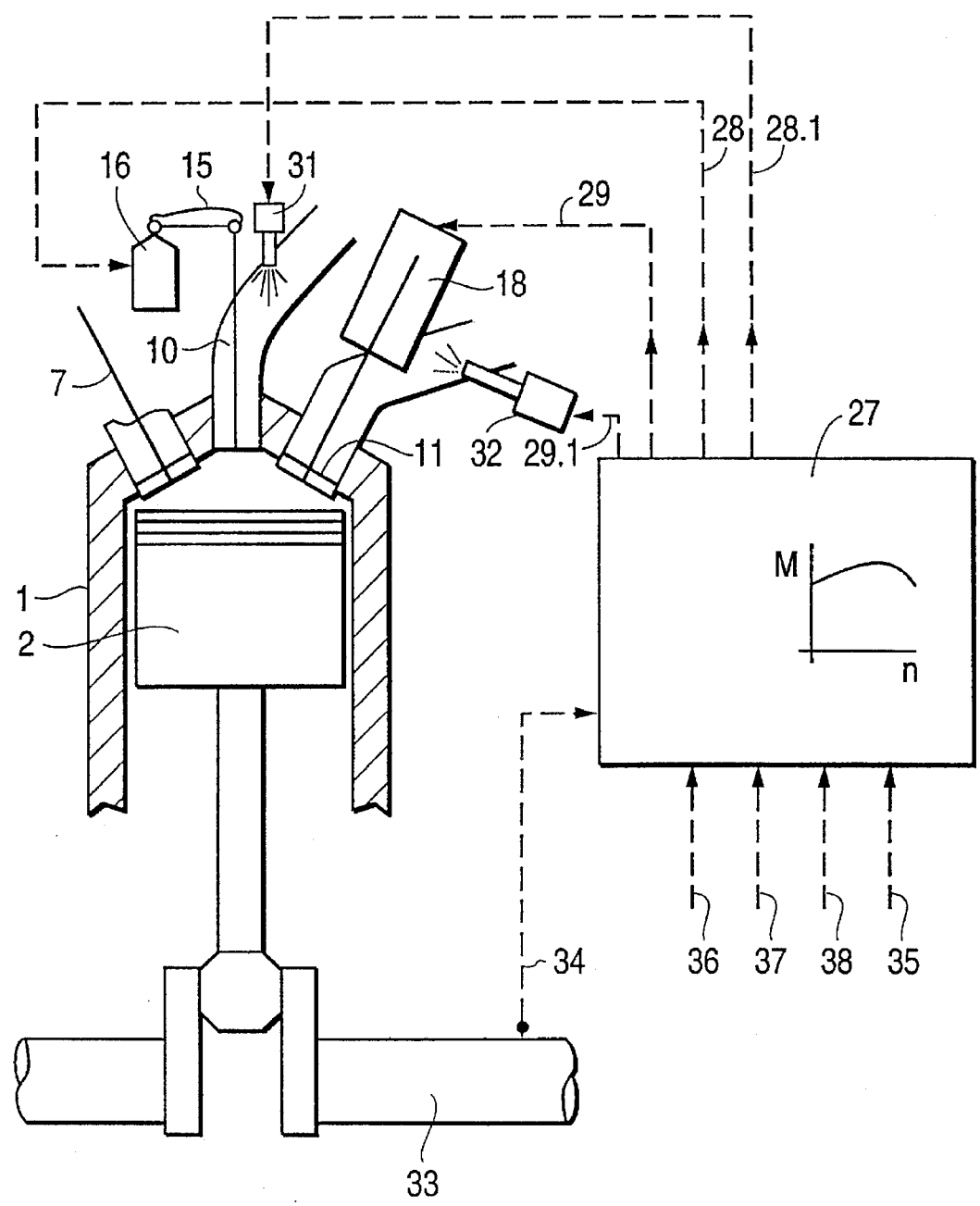
FIG. 5 a block diagram of an engine control.

FIG. 5 shows a block diagram of the actuation of the operating apparatus 18 for a cylinder of a four-stroke Otto engine equipped in the way illustrated and described in FIG. 1. Identical reference numerals indicate identical components, so the above description can be referred to in terms of the construction and function of the engine.

For actuation of the engine, a control device 27 is provided, in which a predetermined characteristic field is stored with its individual switching ranges, for example a lower partial-load range 20 with a predetermined rpm limit and a predetermined switching range 21 and an upper partial-load range 22, as described by way of the schematic characteristic field in FIG. 3. The corresponding control parameters for actuation of the ignition, the fuel supply and the control of the valves as a function of at least the load setting and the engine rpm are stored in the computer of the control device 27.

The rpm is detected from the crankshaft 33 by an appropriate sensor 34 and fed to the control device 27 as a control signal. Furthermore, the load setting, that is, the position of the gas pedal, is entered into the control device 27 as an appropriate setting signal 35 via an appropriate transmitter, not shown in detail here. In addition to these basic data, the cooling water temperature (signal 36) tapped by the sensor and the external temperature (signal 37) and the ambient pressure (signal 38) can be fed to the control device as further control parameters in order to be able to optimally generate the actual operating conditions in the signal processing to generate the corresponding setting signals as a function of the respective position in the operating characteristic field.

If the engine operates in the lower partial-load and rpm range predetermined by the characteristic field 20 (FIG. 3), the cutoff apparatus 16 for the cam-controlled intake valve 10 is actuated by means of an output signal 28, so that the intake valve 10 is held in the closed position. At the same time, the fuel supply to the intake valve 10 is cut off by means of the control signal 28.1, the fuel supply being indicated by an injection nozzle of a corresponding injection system for the upper partial-load and rpm range. At the same time, the operating apparatus 18 is actuated by means of a corresponding control signal 29, and the additional valve 11 is opened as a function of the conditions for the partial-load range that are predetermined by the programmed operating characteristic field, as described above, for example, in the description of FIG. 4. The fuel supply for the lower partial-load and rpm operation is controlled by means of an appropriate control signal 29.1, as indicated schematically by an injection valve 32 associated with the additional valve 11.

We claim:

1. A four-stroke Otto engine comprising:
    a cylinder having an interior;
    at least one intake conduit disposed to be in flow communication with the interior of the cylinder for supplying at least one of air and an air-fuel mixture thereto;

at least two intake valves being disposed to open and close the at least one intake conduit, each of the intake valves having an open position and a closed position, the intake valves further including:
  at least one main intake valve; and
  at least one additional intake valve;
at least one outlet conduit disposed to be in flow communication with the interior of the cylinder for allowing exhaust gases to be exhausted therefrom;
at least one outlet valve disposed to open and close the at least one outlet conduit;
at least one outlet control device operatively connected to the outlet valve for positively controlling an actuation thereof for opening and closing the outlet conduit;
main intake valve actuation means operatively connected to the main intake valve and including:
  a camshaft operatively connected to the main intake valve for moving the main intake valve into one of its open position and its closed position; and
  a transmission element connected between the camshaft and the main intake valve for transmitting an actuation of the camshaft to the main intake valve for moving the main intake valve into one of its open position and its closed position, the transmission element including a cutoff apparatus actuatable independently of the camshaft and operatively connected thereto for cutting off a transmission of the actuation of the camshaft to the main intake valve for keeping the main intake valve in its closed position in a lower partial load and rpm range of the engine;
an operating apparatus connected to the additional intake valve for actuating the additional intake valve independently of the main intake valve actuation means for moving the additional intake valve into its open position in the lower partial load and rpm range of the engine and into its closed position in an upper partial load and rpm range of the engine, the operating apparatus further being adapted to adjust at least one of a valve stroke of the additional intake valve, a valve opening time of the additional intake valve and a valve closing time of the additional intake valve as a function of engine load;
an intake control device operatively connected to the intake valves and including:
  a cutoff control means connected to the cutoff apparatus of the transmission element for effecting an actuation the cutoff apparatus for keeping the main intake valve in its closed position in the lower partial load and rpm of the engine; and
  an operating apparatus control means connected to the operating apparatus for moving the additional intake valve into its open position in the lower partial load and rpm of the engine and into its closed position in the upper partial load and rpm of the engine and for adjusting at least one of the valve stroke of the additional intake valve, the valve opening time of the additional intake valve and the valve closing time of the additional intake valve as a function of load conditions of the engine.

2. The four-stroke Otto engine according to claim 1, wherein the operating apparatus is configured for stepless adjustment of at least one of the valve stroke of the additional intake valve, the valve opening time of the additional intake valve and the valve closing time of the additional intake valve.

3. The four-stroke Otto engine according to claim 1, wherein the at least one intake conduit includes at least two intake conduits, the main intake valve being disposed to open and close one of the at least two intake conduits, and the additional intake valve being disposed to open and close another one of the at least two intake conduits.

4. The four-stroke Otto engine according to claim 2, wherein the at least one intake conduit includes at least two intake conduits, the main intake valve being disposed to open and close one of the at least two intake conduits, and the additional intake valve being disposed to open and close another one of the at least two intake conduits.

5. The four-stroke Otto engine according to claim 1, wherein the cutoff apparatus is one of mechanically, electromechanically and hydraulically operated.

6. The four-stroke Otto engine according to claim 1, wherein the operating apparatus is electromechanically operated.

7. The four-stroke Otto engine according to claim 1, wherein, in the upper partial load and rpm range of the engine, the transmission element is adapted to actuate the main intake valve into its open position.

8. A method of operating a four-stroke Otto engine comprising:
  a cylinder having an interior;
  at least one intake conduit disposed to be in flow communication with the interior of the cylinder for supplying at least one of air and an air-fuel mixture thereto;
  at least two intake valves being disposed to open and close the at least one intake conduit, each of the intake valves having an open position and a closed position, the intake valves further including:
    at least one main intake valve; and
    at least one additional intake valve;
  at least one outlet conduit disposed to be in flow communication with the interior of the cylinder for allowing exhaust gases to be exhausted therefrom;
  at least one outlet valve disposed to open and close the at least one outlet conduit;
  at least one outlet control device operatively connected to the outlet valve for positively controlling an actuation thereof for opening and closing the outlet conduit;
  main intake valve actuation means operatively connected to the main intake valve and including:
    a camshaft operatively connected to the main intake valve for moving the main intake valve into one of its open position and its closed position; and
    a transmission element connected between the camshaft and the main intake valve for transmitting an actuation of the camshaft to the main intake valve for moving the main intake valve into one of its open position and its closed position, the transmission element including a cutoff apparatus actuatable independently of the camshaft and operatively connected thereto for cutting off a transmission of the actuation of the camshaft to the main intake valve for keeping the main intake valve in its closed position in a lower partial load and rpm range of the engine;
  an operating apparatus connected to the additional intake valve for actuating the additional intake valve independently of the main intake valve actuation means for moving the additional intake valve into its open position in the lower partial load and rpm range of the engine and into its closed position in an upper partial load and rpm range of the engine, the operating apparatus further being adapted to adjust at least one of a valve stroke of the additional intake valve, a valve opening time of the additional intake valve and a valve closing time of the additional intake valve as a function of engine load;

an intake control device operatively connected to the intake valves and including;:
- a cutoff control means connected to the cutoff apparatus of the transmission element for effecting an actuation the cutoff apparatus for keeping the main intake valve in its closed position in the lower partial load and rpm of the engine; and
- an operating apparatus control means connected to the operating apparatus for moving the additional intake valve into its open position in the lower partial load and rpm of the engine and into its closed position in the upper partial load and rpm of the engine and for adjusting at least one of the valve stroke of the additional intake valve, the valve opening time of the additional intake valve and the valve closing time of the additional intake valve as a function of load conditions of the engine;

the method comprising the steps of:
- moving the main intake valve into its open position and keeping the additional intake valve in its closed position in the upper partial load and rpm range of the engine; and
- keeping the main intake valve in its closed position and moving the additional intake valve into its open position in the lower partial load and rpm range of the engine.

* * * * *